US011383860B1

(12) United States Patent
Diggans

(10) Patent No.: US 11,383,860 B1
(45) Date of Patent: Jul. 12, 2022

(54) SYSTEM AND METHOD OF SPACE OBJECT TRACKING AND SURVEILLANCE NETWORK CONTROL

(71) Applicant: GOVERNMENT OF THE UNITED STATES AS REPRESENTED BY THE SECRETARY OF THE AIR FORCE, Rome, NY (US)

(72) Inventor: Christopher Tyler Diggans, Fayetteville, NY (US)

(73) Assignee: United States of America as represented by the Secretary of the Air Force, Rome, NY (US)

(*) Notice: Subject to any disclaimer, the term of this patent is extended or adjusted under 35 U.S.C. 154(b) by 764 days.

(21) Appl. No.: 16/367,663

(22) Filed: Mar. 28, 2019

Related U.S. Application Data

(60) Provisional application No. 62/651,920, filed on Apr. 3, 2018.

(51) Int. Cl.
*G06N 5/04* (2006.01)
*G01S 19/51* (2010.01)
*B64G 3/00* (2006.01)
*G06V 10/75* (2022.01)

(52) U.S. Cl.
CPC .............. *B64G 3/00* (2013.01); *G01S 19/51* (2013.01); *G06N 5/04* (2013.01); *G06V 10/76* (2022.01)

(58) Field of Classification Search
CPC .......... B64G 3/00; G06V 10/76; G01S 19/51; G06N 5/04
See application file for complete search history.

*Primary Examiner* — Mathew Franklin Gordon
(74) *Attorney, Agent, or Firm* — AFRL/RIJ; Randall P. Jones

(57) ABSTRACT

Various embodiments of the disclosed subject matter provide systems, methods, architectures, mechanisms, apparatus, computer implemented method and/or frameworks configured for tracking Earth orbiting objects and adapting SSN tracking operations to improve tracking accuracy while reducing computational complexity and resource consumption associated with such tracking.

18 Claims, 4 Drawing Sheets

SYSTEM AND METHOD OF SPACE OBJECT TRACKING AND SURVEILLANCE NETWORK CONTROL

CROSS-REFERENCE TO RELATED APPLICATION

This application claims the benefit of and priority to prior filed Provisional Application Ser. No. 62/651,920, filed Apr. 3, 2018, entitled SPACE OBJECT TRACKING USING SPECTRAL CLUSTERING METHODS, which provisional patent application is incorporated herein by reference in its entirety.

GOVERNMENT INTEREST

The invention described herein may be manufactured and used by or for the Government of the United States for all governmental purposes without the payment of any royalty.

FIELD OF THE DISCLOSURE

The present disclosure relates generally to systems and methods for tracking objects in space and, more particularly, to tracking objects in space and controlling a surveillance network configured to perform space object identifications and measurement functions.

BACKGROUND

Currently, a space surveillance network (SSN) tracks the orbits of over 20,000 earth orbiting objects larger than 10 cm using various implementations of "Batched Least Squares" Orbit Determination, Kalman Filters and the like to estimate the state of the various objects. While present orbit determination and state estimation mechanisms work reasonably well, the exponentially increasing number of objects to be tracked is straining the ability of the SSN to maintain sufficient tracking accuracy within a reasonable amount of time due to factors such as corresponding increases in computational complexity and cost of combinatorial-based correlation algorithms.

SUMMARY OF THE INVENTION

Various deficiencies in the prior art are addressed below by the disclosed systems, methods, architectures, mechanisms, apparatus, computer implemented method and/or framework configured for tracking Earth orbiting objects and adapting tracking operation to improve tracking accuracy while reducing computational complexity and resource consumption associated with such tracking.

Various embodiments provide a mechanism by which a SSN is configured to generate accurate orbital element sets for collections of uncorrelated Earth orbiting objects by operating with a feedback process based on time stamped position-only observations. In this manner, uncorrelated observations from events such as an object break-up can be identified without the computational issues combinatorial approaches present, while providing an additional capability of possible global analysis of a set of all recent object measurements. The various embodiments utilize novel global data set clustering methods to sort SSN observations by object, followed by the use of differential correction-based orbit determination methods to determine an orbital element set for each resultant cluster. Further, a Bayesian Inference or other technique is used to determine a next orbital location to observe each object or object cluster such that tasking orders may be directed to the SSN which configure the SSN to efficiently generate time stamped position-only observations of the object or object cluster in a manner maximizing the accuracy of the evolving orbital element set associated with the object or object cluster.

An embodiment according to one method comprises a computer implemented method for improved tracking of objects in Earth orbit by a Space Surveillance Network (SSN), the method comprising: receiving a dataset comprising initial state estimations of either a group of uncorrelated objects or each tracked object in earth orbit; partitioning the dataset into a plurality of clusters of observations using an algorithmic similarity measure incorporating global information and spectral clustering; for each cluster of observations, generating an orbital element set description of the cluster of observations; for each cluster of observations, determining a true anomaly location on the respective orbit associated with providing a largest increase in accuracy to the respective orbital description, the determining being made using either Bayesian inference or identification of a true anomaly furthest from all previous observations on orbit, but within range of SSN; for each cluster of observations, generating a tasking order configured to cause SSN observation of a projected position-time pair associated with the true anomaly location on the respective orbit; and transmitting the generated tasking orders toward the SSN.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Figure 1:
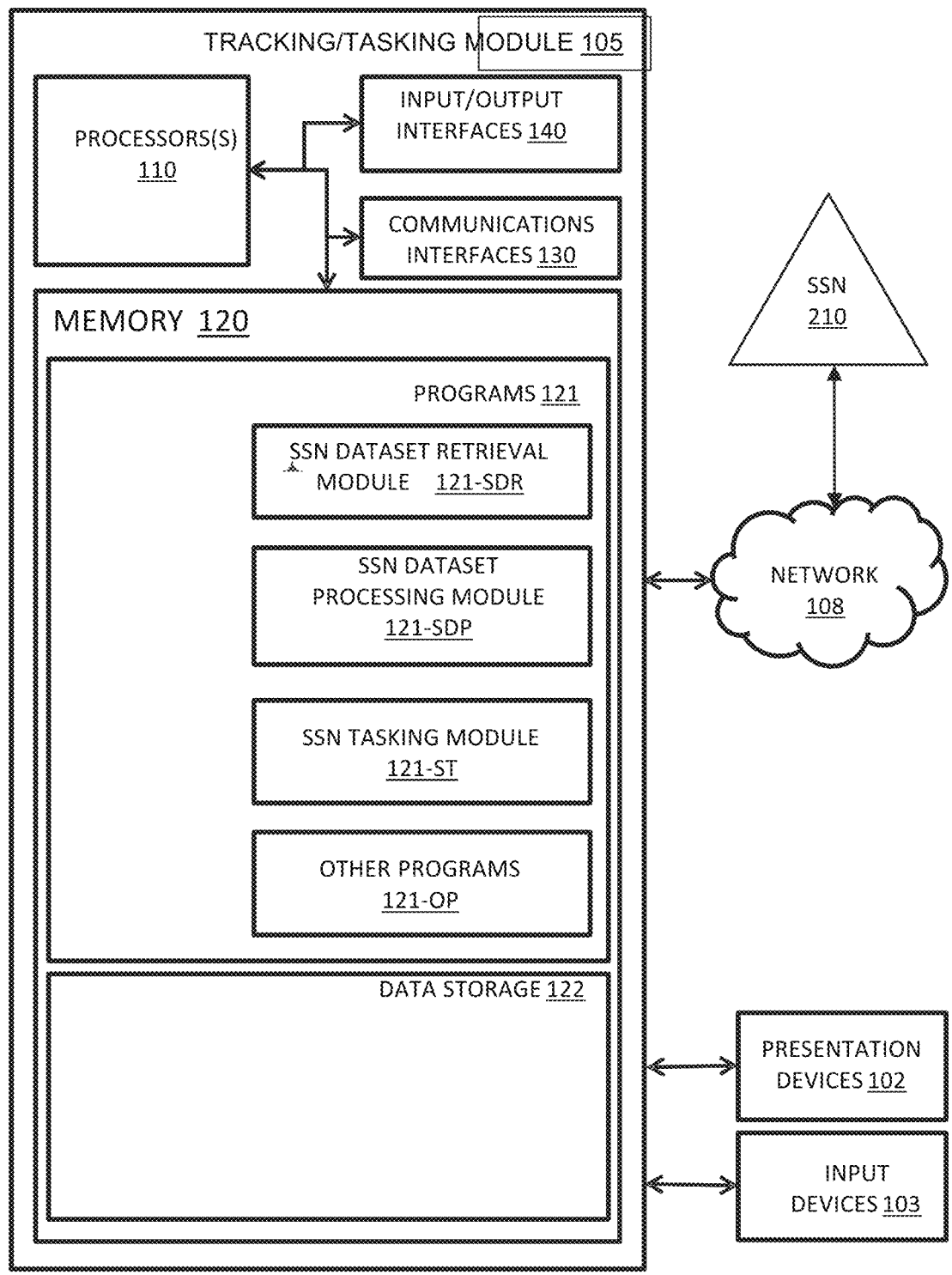
FIG. 1 depicts a high-level block diagram of an object estimation and SSN tasking system according to an embodiment.

FIG. 1 depicts a high-level block diagram of an object state estimation and SSN tasking system according to an embodiment. The system 100 of FIG. 1 comprises one or more data processing elements, computing devices, network elements and the like cooperating as described herein to implement various embodiments. Not all of the described data processing elements, computing devices, network elements and the like are necessary to implement each embodiment. The exemplary system 100 described herein is provided for illustrative purposes only.

The system 100 of FIG. 1 contemplates a server, workstation or other computing device implementing a space object tracking and SSN tasking module 105 operating in accordance to the various embodiments, such as described herein and with respect to the various other figures. Specifically, the system 100 of FIG. 1 is configured to process SSN generated data sets comprising time-stamped position data associated with objects in orbit, utilize novel global clustering methods, which use the data set as context to sort SSN observations by object, followed by fitting an orbital element set to each resultant cluster, which describes the objects state. Further, a Bayesian Inference or other technique is used to determine a next orbital location to observe each object or object cluster such that tasking orders may be directed to the SSN which configure the SSN to efficiently generate time stamped position-only observations of the object or object cluster in a manner maximizing the accuracy of the evolving orbital description associated with the object or object cluster.

Various embodiments provide a mechanism by which a SSN is configured to generate accurate orbital descriptions of orbiting objects by operating with a feedback process based on time stamped position-only observations. In this manner, more orbiting objects may be observed in the same amount of time by the SSN, while providing an additional capability of a global analysis of a set of all recent object measurements.

In various embodiments, the tracking and tasking module 105 is configured to receive various time-stamped position data sets or portions thereof associated with objects in orbit such as surveilled by the SSN 210, process the data sets in accordance with the various methodologies described herein, estimate various orbital elements/parameters associated with clusters of similar objects and generate/revise tasking orders configured to cause the SSN to observe orbital locations expected to be associated with the object or object clusters of interest.

As shown in FIG. 1, the tracking and tasking module 105 is configured in a particular manner in terms of hardware, software, input/output resources, connected devices/functions and the like. However, it will be appreciated by those skilled in the art that the tracking and tasking module 105 may be configured according to any one of a number of computing topologies or configurations. That is, tracking and tasking module 105 may comprise a general-purpose computer, a special purpose computer, a specific type of server and/or any other computing device capable of performing the various functions described herein. Thus, the tracking and tasking module 105 as described herein with respect to FIG. 1 may also be implemented as a general-purpose computing device.

As depicted in FIG. 1, the tracking and tasking module 105 includes one or more processors 110, a memory 120, a communications interface 130 and an input/output (I/O) interface 140. The processor 110 is coupled to each of memory 120, communication interface 130, and I/O interface 140.

The processor 110 is configured for controlling the operation of tracking and tasking module 105, including operations supporting the methodologies described herein with respect to the various figures, as well as any interactions with the SSN 210 such as via a network 108.

The memory 120 is configured for storing information suitable for use in performing the various tracking and tasking functions described herein according to the various embodiments. Specifically, memory 120 may store programs 121, data 122 and so on. Within the context of the various embodiments, the programs 121 and data 122 may vary depending upon the specific functions implemented by the tracking and tasking module 105. For example, as depicted in FIG. 1, the programs portion 121 of memory 120 includes functional modules denoted as follows: a SSN data set retrieval module 121-SDR, a SSN data set processing module 121-SDP, a SSN tasking module 121-ST and various other programs 121-OP suitable for use in implementing or supporting the various embodiments.

The SSN data set retrieval module 121-SDR provides a mechanism to manage a retrieval and storage (e.g., in data storage 122) of time-stamped position data generated by the SSN 210. The SSN data set processing module 121-SDP provides a mechanism to process the retrieved time-stamped position data in accordance with the various embodiments to efficiently identify and track the various objects of interest and to generate updating tasking orders, and the SSN tasking module 121-ST provides a mechanism to communicate updated tasking orders to various managers, entities, tracking assets and the like associated with the SSN 210 to improve operational efficiency thereof.

Generally speaking, the memory 120 may store any information suitable for use by the tracking and tasking module 105 in implementing one or more of the various methodologies or mechanisms described herein. It will be noted that while various functions are associated with specific programs or databases, there is no requirement that such functions be associated in the specific manner. Thus, any implementations achieving the functions of the various embodiments may be used.

The communications interfaces 130 may include one or more services signaling interfaces such as a Wi-Fi or WiMAX interface, a 3G broadband cellular network wireless interface, a 4G broadband cellular network wireless interface, an Ethernet interface and the like for supporting data/services signaling between tracking and tasking module 105 and the network 108. It will be appreciated that fewer or more, as well as different, communications interfaces may be supported. The various communications interfaces 130 are adapted to facilitate the transfer of files, data structures, messages, requests and the like between various entities in accordance with the embodiments discussed herein.

The I/O interface 140 may be coupled to one or more presentation devices (PDs) 102 such as associated with display devices for presenting information to a user, one or more input devices (IDs) 103 such as computer display, touch screen or keypad input devices for enabling user input, and/or interfaces enabling communication between the tracking and tasking module 105 and other computing, networking, presentation or input/output devices (not shown).

Presentation devices 102 may include a display screen, a projector, a printer, one or more speakers, and the like, which may be used for displaying data, displaying video, playing audio, and the like, as well as various combinations thereof. The typical presentation interfaces associated with user devices, including the design and operation of such interfaces, will be understood by one skilled in the art. In various embodiments, the presentation devices 102 used to display information pertaining to the various methodologies. In various embodiments, the presentation devices are not utilized; rather, output/presentation information pertaining to the various methodologies is transmitted to a remote server or other external resource 107.

Input devices 103 may include any user control devices suitable for use in enabling a local or remote user of the tracking and tasking module 105 to interact with the tracking and tasking module 105. For example, the input devices 103 may include touch screen-based user controls, stylus-based user controls, a keyboard and/or mouse, voice-based user controls, and the like, as well as various combinations thereof. The typical user control interfaces of user devices, including the design and operation of such interfaces, will be understood by one skilled in the art. In various embodiments, the input devices 103 are not utilized; rather, input/control information pertaining to the various methodologies is received from a remote server or other external resource 107.

Although primarily depicted and described as having specific types and arrangements of components, it will be appreciated that any other suitable types and/or arrangements of components may be used for tracking and tasking module 105.

It will be appreciated that the functions depicted and described herein may be implemented in software and/or hardware, e.g., using a general-purpose computer, one or more application specific integrated circuits (ASIC), and/or any other hardware equivalents. In one embodiment, the various programs depicted as loaded within memory 120 are executed by the processor(s) 110 to implement their respective functions. It will also be appreciated that the various programs may be stored on a computer readable storage medium prior to being loaded into memory 120; such computer readable storage media comprising semiconductor memory devices, magnetic media, optical media, electromagnetic media and the like. Generally speaking, any form of tangible computer memory may be used to store computer instructions which, when executed by the processor 110, operate to perform the various methods and functions described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a broadcast or other tangible signal-bearing medium, and/or stored within a memory within a computing device operating according to the instructions.

Figure 2:
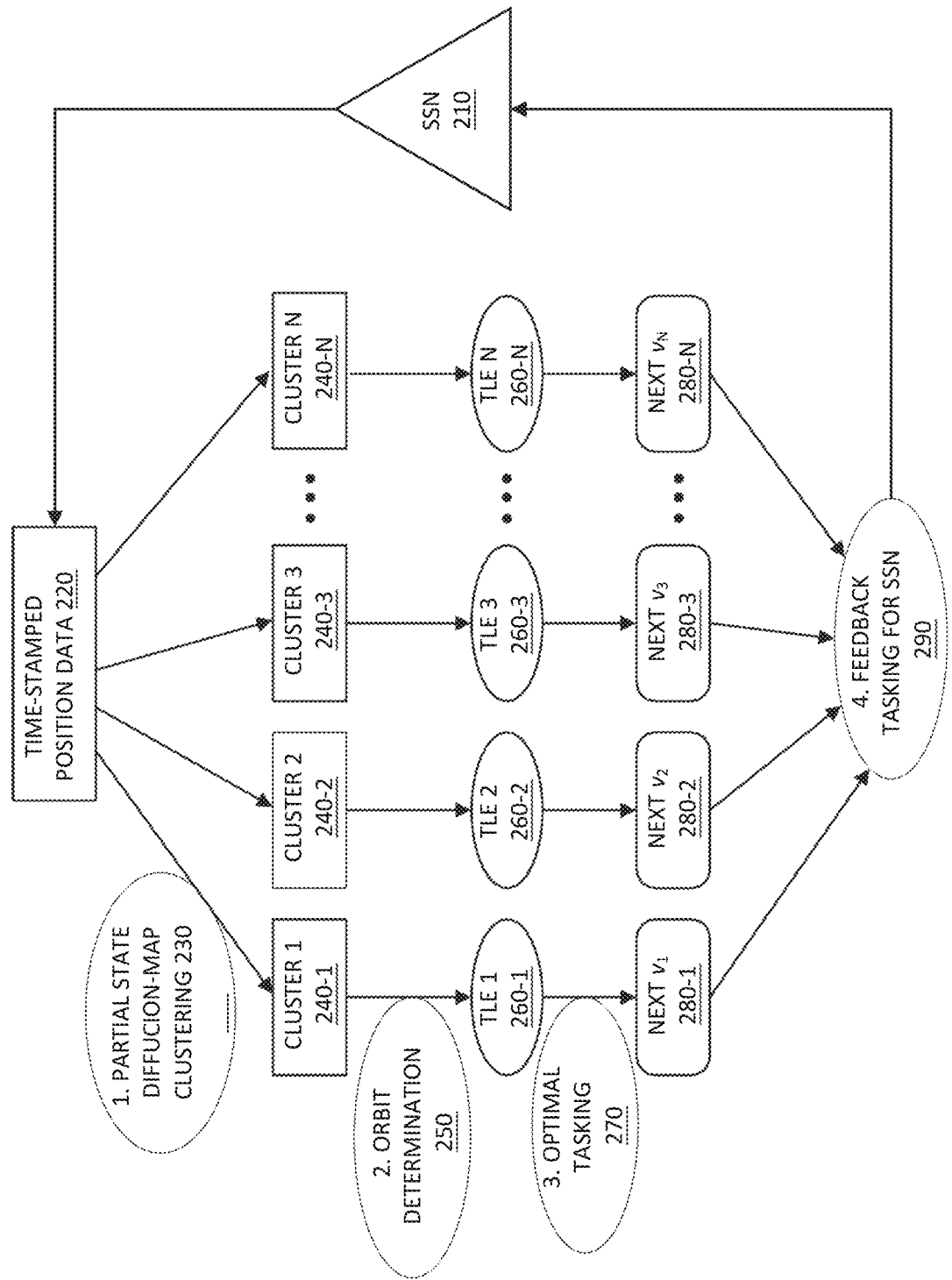
FIG. 2 depicts a process workflow diagram of a Space Surveillance Network (SSN) control mechanism according to an embodiment.

FIG. 2 depicts a process workflow diagram of a Space Surveillance Network (SSN) control mechanism according to an embodiment. Specifically, the process workflow 200 of FIG. 2 contemplates a Space Surveillance Network (SSN) 210 comprising a network of surveillance assets, systems, devices and the like configured to detect, image, sense or otherwise track objects orbiting the earth in response to tasking information. The various embodiments provide a mechanism by which the SSN is configured to generate accurate orbital element sets of Earth orbiting objects by operating within a feedback process based on time stamped position-only observations of objects orbiting the earth. The SSN control mechanism 200 of FIG. 2 may be implemented using the tracking and tasking module 105 discussed above with respect to FIG. 1.

At step 230, initial or current time-stamped position data 220 provided by the SSN 210 is clustered using an algorithmic similarity measure that requires the incorporation of expert knowledge in order to include global information into the clustering process. Known identified observations can be forced in this process and a plurality of clusters of associated observations 240-1 through 240-N (collectively observation clusters 240) are the result of various mechanisms, such as the use of a diffusion map to project the data into an Euclidean clustering space of the same dimension as the state of interest, which may be used to provide spectral based clustering of initial data sets (e.g., data sets including more than time-stamped position data) as well as updated data sets (e.g., data sets including only time-stamped position data).

At step 250, an orbit determination function is used to describe each cluster of observations 240. This could include fitting the data with an elliptical vector value function to each cluster of observations, implementing a standard batched least squares algorithm to incorporate the differential corrections to the initial orbit estimation and/or using various other techniques, optionally with historical discounting, to produce a state estimation for each object. Optionally, a respective TALE 260 (i.e., a respective orbital element set) may be generated.

At step 270, for each identified object 260, a respective true anomaly (Next vk) 280 is determined using an Optimal Tasking technique, such as Bayesian Inference method, to identify an optimal location in orbit for improving state estimations and identifying the closest possible tasking order through the use of known SSN fields of view. For example, for any $k^{th}$ cluster, a true anomaly vk is determined that maximizes an increase in accuracy of the $k^{th}$ orbital element set. The determined set of true anomalies 280-1 through 280-N predict the likely locations of the various objects, such that tasking orders for SSN equipment may be generated in a manner that minimizes the amount of time necessary for the SSN equipment to capture the next set of SSN observations. These observations are then appended to any data sets generated by the SSN 210, such as the time-stamped position data 220. It is noted that over time, older historical positions within the data set lose influence within the context of the orbital set fitting function 250 used to process each of the observation clusters 240. Thus, the process workflow 200 depicted with respect to FIG. 2 utilizes clustering methods to sort SSN observations by object, followed by fitting an orbital element set to each resultant cluster, which can be used to define a TLE description for all of the objects in the cluster. Further, a Bayesian Inference or other technique is used to determine an orbital location to observe an object such that time stamped position-only observations may be made for maximizing the accuracy of the evolving orbital element set or TLE associated with the object. The various embodiments described herein provide numerous advantages over traditional methods. Various embodiments provide that for each cluster of observations a generated tasking order identifies an optimal location in orbit of the cluster of observations. Various embodiments provide that for each cluster of observations a generated tasking order identifies one or more SSN elements suitable for use in viewing the optimal location of the cluster of observations at the appropriate time. Various embodiments provide that one or more SSN tasking orders are transmitted toward appropriate SSN elements within the SSN.

In various embodiments, machine learning mechanisms are employed to continually improve the accuracy of orbital element/description information associated with orbiting objects and clusters of similarly positioned orbiting objects, and to continually improve the tasking orders provided to the Space Surveillance Network such that the entire system operates in a more accurate and computationally efficient manner.

Generally speaking, various embodiments contemplate that an initial state estimation is obtained for each object of interest, while subsequent observations of the objects only record position and time data.

Initial object state estimations in accordance with various embodiments may comprise a set of observations including for each object a time of observation and either (1) azimuth, elevation and range data for an object in LEO (radar measurements), or (2) right ascension and declination (angle-only) for an object in GEO (optical measurements). Further, additional information about the site/apparatus used (covariance matrix of error) may be associated with each observation; the additional information finding use as weighting within the context of "Batched LS" embodiments.

Subsequent observations in accordance with various embodiments are guided such that these observations are purposeful in that they are made at specific points in the objects' orbits determined to be most likely to yield a useful observation.

Similarity matrices of subsets of data are created in accordance with various embodiments, optimally where error tolerances may be changed/adapted for accuracy and speed. While a similarity measure will use a so-called "initial orbit determination method," this method may vary depending on the data and accuracy needed. In various embodiments, similarity measures may be provided using one or more of Gibbs, Herrick-Gibbs, Gauss's, Gooding's, Double-R iteration methods and the like.

The objects under observation are partitioned or spectrally clustered in accordance with various embodiments. Various embodiments contemplate the use of a 6-dimensional diffusion map to project the object data into a Euclidean space that represents orbital element space, and then use spectral clustering in this reduced space.

Various embodiments contemplate the use of a least squares fit of an elliptical vector value function to the data points for each object to define the orbits for each piece of debris in a break-up scenario. The objects are recursively observed at true anomalies based on Bayesian inference or other technique to provide increased orbital element accuracy. The similarity matrices are updated by row and column replacement and the resulting information is used to reclassify or re-task observation resources to improve speed/accuracy of subsequent observations of objects of interest. At regular intervals the entire similarity matrix will need to be updated to incorporate the global information in the subsequent clustering and tasking.

Spectral Clustering in accordance with various embodiments may be performed in the following manner:

Given a set of data points, $$\{\vec{x}_n\}_{n=0}^{N} \subset R^d,$$

the following steps are performed:

1. Define a non-negative symmetric kernel function, $k(\vec{x}, \vec{y})$ that includes global information from the data set as a whole algorithmically;
2. Generate an N by N matrix S by letting $S_{ij}=k(\vec{x}_i,\vec{x}_j)$
3. Normalize the matrix S, such as to a graph Laplacian, L; and
4. Use the Eigenspace of L to categorize the data globally, optionally in a reduced dimensionality through the use of a diffusion map or other dimensionality reduction techniques.

Figure 3:
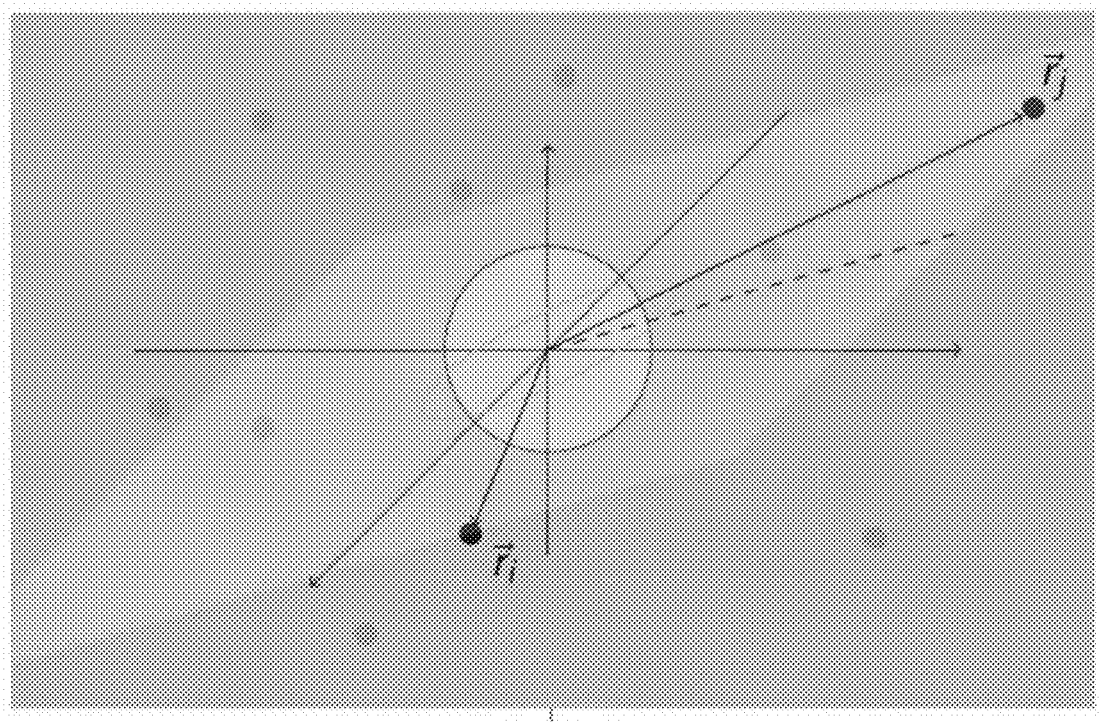
FIGS. 3-4 graphically depicts an orbital plane and projection thereupon of an exemplary observed tracked object.

Referring to FIG. 3, an orbital plane for tracking an object in space is depicted in which, given $$\vec{r}_i, \vec{r}_j$$

in ECI coordinates and $\Delta t$, a kernel $k(\vec{x}, \vec{y})$ parameterized by the data set itself is defined that quantifies how likely $$\vec{r}_i$$

and are to be the same object using the entire data set as context. Further, the inclusion of expert hueristics allows human knowledge to be incorporated into the comparison.

Figure 4:
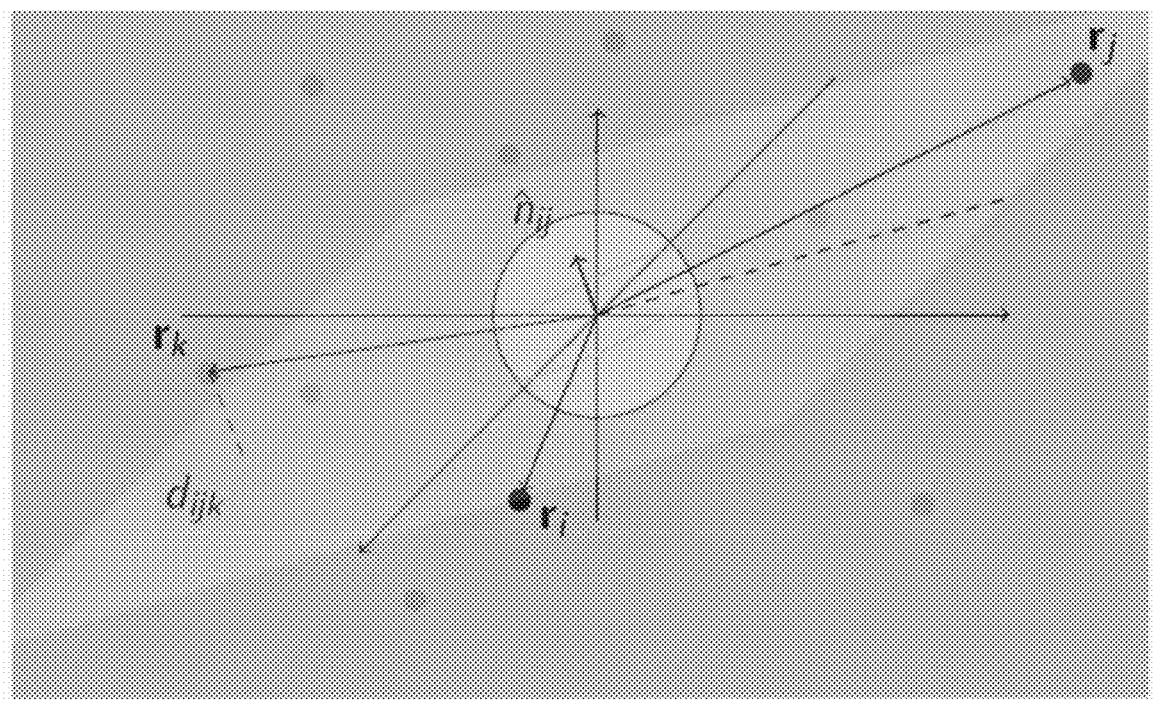

Referring to FIG. 4, using the orbital plane defined by the cross product of $$\vec{r_i}$$

and $$\vec{r_j},$$

the projection $$d_{ijk} = Proj_{n^{\wedge}ij}(\vec{r_k})$$

is found for each observation. Comparing this projection length with known measurement errors, it is determined whether that point should be considered further using expert heuristics. This check reduces the multiplier of the computational complexity by orders of magnitude.

Figure 5:
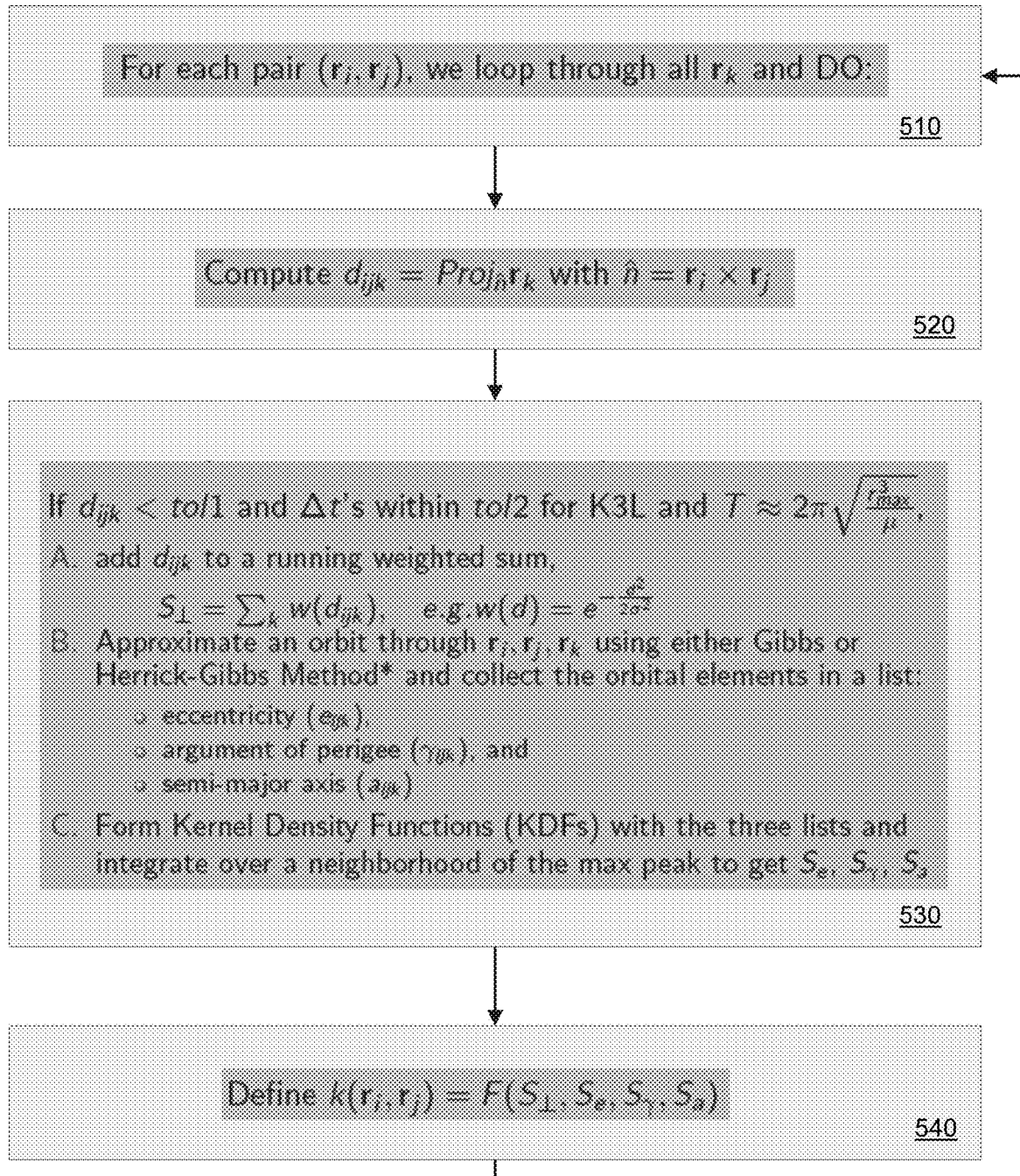
FIG. 5 depicts a flow diagram of a method of defining a kernel function suitable for use in determining an orbital location of an object of interest.

FIG. 5 depicts a flow diagram of a method of defining a kernel function suitable for use in determining an orbital location of an object of interest. In particular, the kernel function definition method assumes that orbiting objects are substantially uniformly represented in observations by the SSN, that the measurement error is an order of magnitude smaller than the orbital differences, and that observations of each object are taken at more than one true anomaly (v).

Applicability of the embodiments to an "assignment of uncorrelated observations" use case. Specifically, while the various embodiments are useful for global space tracking in terms of applying the process to all objects all the time, it is contemplated that the various embodiments are especially useful for those specific instances of tracking that can be referred to as the assignment of large numbers of uncorrelated observations. These generally fall into two classes of problems; namely, object break-up debris and clusters of satellites (like cube satellites or other groups of small objects that share a general orbit). The various embodiments find particular utility within the context of the identification and orbit prediction of the dozens, hundreds or even thousands of pieces of debris resulting from a collision event. Of particular relevance to the solving of these problems is the incorporation of the global data set aware clustering tool and related methods described herein.

Thus, the various embodiments utilize clustering methods to sort SSN observations by object, followed by fitting an orbit to each resultant cluster, which can be used to define a TLE description for all of the observations in the cluster. Further, a Bayesian Inference approach is used to determine an orbital location to observe an object such that time stamped position-only observations may be made for maximizing the accuracy of the evolving TLE or other orbital set representation associated with the object. The various embodiments described herein provide numerous advantages over traditional methods.

(1) The time complexity of the process is $O(N^3)$, where N is the number of observations. The current state of the art, Multiple Hypothesis Correlation (MHC), attempts to solve a mixed integer nonlinear programming (MINLP) problem using a branch and bound method resulting in exponential time complexity.

(2) Subsets of the database can be selected and treated separately for the cases of object break-up, which is a current space tracking capability gap. The various embodiments will provide usable information on object break-ups in near real-time, which is not possible to obtain from MHC.

(3) Under the threat of the hypothesized Kessler Syndrome becoming a reality and increased commercial use of the space domain, various embodiments advantageously provide important computationally efficient tracking solutions that will scale better as the number of objects continues to grow.

(4) The use of Bayesian inference allows increased accuracy of orbital definitions with minimal additional observation tasking of the SSN, and further enable adaptive improvement of orbital decay parameters by tracking the historical discounting factor for various orbital elements.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A computer implemented method for improved tracking of objects in earth orbit by a Space Surveillance Network (SSN), the method comprising:
    receiving a dataset comprising initial state estimations of either a group of uncorrelated objects or each tracked object in earth orbit;
    partitioning the dataset into a plurality of clusters of observations using an algorithmic similarity measure incorporating global information and spectral clustering;
    for each cluster of observations, generating an orbital element set description of the cluster of observations;
    for each cluster of observations, determining a true anomaly location on the respective orbit associated with providing a largest increase in accuracy to the respective orbital description, said determining being made using either Bayesian inference or identification of a true anomaly furthest from all previous observations on orbit;
    for each cluster of observations, generating a tasking order configured to cause SSN observation of a projected position-time pair associated with the true anomaly location on the respective orbit; and
    transmitting said generated tasking orders toward the SSN.

2. The method of claim 1, wherein the spectral clustering is performed in accordance with at least one of a diffusion map technique and an eigenspace technique.

3. The method of claim 1, wherein partitioning the dataset is performed in accordance with expert heuristics.

4. The method of claim 1, wherein generating the orbital element set description is performed by finding a least squares fit of an elliptical vector function to the cluster of observations using a stochastic gradient descent mechanism.

5. The method of claim 1, wherein generating the orbital element set description is performed using batched least squares including differential corrections in orbit determination.

6. The computer implemented method of claim 1, further comprising receiving dataset updates comprising time-stamped position information associated with each of the plurality of clusters of observations.

7. The computer implemented method of claim 1, wherein the data set is partitioned into clusters associated by likelihood of being the same object through the use of algorithmic similarity measure and spectral clustering techniques.

8. The computer implemented method of claim 6, wherein historical discounting is applied to said time-stamped position information prior to either fitting an elliptical vector value function to each cluster of observations or implementing a standard batched least squares algorithm to incorporate the differential corrections to the initial orbit estimation.

9. The computer implemented method of claim 4, wherein fitting an elliptical vector value function to a cluster of observations is performed using an adaptive stochastic gradient descent algorithm developed for this purpose.

10. The computer implemented method of claim 1, wherein determining said true anomaly locations is performed using a Bayesian Inference approach.

11. The computer implemented method of claim 1, wherein determining said true anomaly locations is performed using identification of a true anomaly furthest from all previous observations on orbit.

12. The computer implemented method of claim 1, wherein identifying within the SSN Field of View the closest true anomalies to the output of the Bayesian estimation algorithm.

13. The computer implemented method of claim 1, further comprising transmitting one or more SSN tasking orders toward appropriate SSN elements within the SSN.

14. The computer implemented method of claim 1, wherein for each cluster of observations said generated tasking order identifies an optimal location in orbit for improving state estimations of the cluster of observations.

15. The computer implemented method of claim 14, wherein for each cluster of observations said generated tasking order identifies SSN elements suitable for use in viewing the optimal location of the cluster of observations.

16. A computer implemented method for improved tracking of objects in earth orbit by a Space Surveillance Network (SSN), the method comprising:
receiving a set of observations comprising time-stamped position-based observation data for uncorrelated objects along with relevant error estimates for each observation in the form of a covariance matrix;
determining a number of unique objects represented by the set of observations;
partitioning the set of observations into clusters associated with a unique object;
implementing initial orbital determination methods along with batched least squares differential corrections to produce a state estimation for each object;
implementing a Bayesian inference method to identify an optimal orbital location for improving the state estimations and identifying a closest possible tasking order using known SSN fields of view; and
transmitting said generated tasking orders toward the SSN.

17. An apparatus for improved tracking of objects in earth orbit by a Space Surveillance Network (SSN), the apparatus comprising:
a tracking/tasking module, operatively coupled to a SSN via a network;
the tracking/tasking module comprising a dataset retrieval module configured for receiving from the SSN a set of observations comprising time-stamped position-based observation data for uncorrelated objects along with relevant error estimates for each observation in the form of a covariance matrix;
the tracking/tasking module comprising a dataset processing module configured for determining a number of unique objects represented by the set of observations, partitioning the set of observations into clusters associated with a unique object, implementing initial orbital determination methods along with batched least squares differential corrections to produce a state estimation for each object and implementing a Bayesian inference method to identify an optimal orbital location for improving the state estimations;
the tracking/tasking module comprising a SSN tasking module configured for identifying a closest possible tasking order using known SSN fields of view, and transmitting said generated tasking orders toward the SSN.

18. A tangible and non-transient computer readable storage medium storing computer-executable instructions which, when executed by a system of computer processors, adapt the operation of the system to perform a method for improved tracking of objects in earth orbit by a Space Surveillance Network (SSN), comprising:
receiving a set of observations comprising time-stamped position-based observation data for uncorrelated objects along with relevant error estimates for each observation in the form of a covariance matrix;
determining a number of unique objects represented by the set of observations;
partitioning the set of observations into clusters associated with a unique object;
implementing initial orbital determination methods along with batched least squares differential corrections to produce a state estimation for each object;
implementing a Bayesian inference method to identify an optimal orbital location for improving the state estimations and identifying a closest possible tasking order using known SSN fields of view; and
transmitting said generated tasking orders toward the SSN.

* * * * *